US012295901B1

(12) United States Patent
Yang

(10) Patent No.: US 12,295,901 B1

(45) Date of Patent: May 13, 2025

(54) ADULT MASSAGER

(71) Applicant: Biao Yang, Hunan (CN)

(72) Inventor: Biao Yang, Hunan (CN)

( * ) Notice: Subject to any disclaimer, the term of this patent is extended or adjusted under 35 U.S.C. 154(b) by 0 days.

(21) Appl. No.: 18/797,993

(22) Filed: Aug. 8, 2024

(51) Int. Cl.
*A61H 23/02* (2006.01)
*A61H 19/00* (2006.01)

(52) U.S. Cl.
CPC ......... *A61H 23/0254* (2013.01); *A61H 19/00* (2013.01); *A61H 19/32* (2013.01); *A61H 2201/0192* (2013.01); *A61H 2201/1215* (2013.01); *A61H 2201/1454* (2013.01); *A61H 2201/1664* (2013.01); *A61H 2201/1671* (2013.01)

(58) Field of Classification Search
CPC .... A61H 19/00–50; A61H 23/00–0245; A61H 23/0263–06; A61H 2023/002–045; A61H 2201/0192; A61H 2201/1215; A61H 2201/1454; A61H 2201/1664; A61H 2201/1671; A61F 5/451
USPC ............................................................ 600/38
See application file for complete search history.

(56) References Cited

U.S. PATENT DOCUMENTS 11,980,582 B1 * 5/2024 Wang ................. A61H 23/0254
2024/0099930 A1 * 3/2024 Luo .......................... A61H 7/00

FOREIGN PATENT DOCUMENTS

CN 109223496 A * 1/2019 ............. A61H 19/30
CN 117335235 A * 1/2024 ............. A61H 19/32

OTHER PUBLICATIONS

Translation of CN 109223496A. (Year: 2019).*
Translation of CN 117335235A (Year: 2024).*

* cited by examiner

*Primary Examiner* — Kendra D Carter
*Assistant Examiner* — Paige Kathleen Bugg
(74) *Attorney, Agent, or Firm* — Daniel M. Cohn; Howard M. Cohn

(57) ABSTRACT

The present disclosure provides an adult massager, comprising: a shell assembly; a telescopic rotating motor fixedly arranged in the shell assembly; a telescopic frame assembly is movably arranged on the shell assembly and is drivingly connected to the telescopic rotating motor, the telescopic rotating motor drives the telescopic frame assembly to telescope and rotate relative to the shell assembly; a cup body assembly is transmission-connected to the telescopic frame assembly, the telescopic frame assembly drives the cup body assembly to telescope and rotate relative to the shell assembly; a positive electrode electrical connection sheet and a negative electrode electrical connection sheet, which are respectively fixedly arranged on the bracket and insulated from each other, are respectively rotatably electrically connected to the cup body assembly.

18 Claims, 8 Drawing Sheets

ADULT MASSAGER

TECHNICAL FIELD

The present disclosure relates to a technical field of sex products, and in particular to an adult massager.

BACKGROUND

With the development of economy and the progress of society, males are under great pressure at work due to the heavy, busy and fast pace of work, so relieving the pressure of daily work has become inevitable and a social consensus. Various electrical appliances are increasingly developing towards the direction of relieving work pressure, being easy to use, safe and efficient, and having multiple functions. Massagers, as an important part of people's daily electrical appliances, are no exception. At present, the functions of existing massagers are relatively simple and cannot relieve daily work pressure and improve the rhythm of life according to user needs, which greatly reduces the user experience of such products. Therefore, an adult massager is provided to solve the problem of the single function of existing massagers.

SUMMARY

The present disclosure provides an adult massager, which provides telescopic, rotating and vibrating functions, so as to solve the problem that the existing massagers are lack of functionality.

In order to realize the above purpose, the present disclosure provides an adult massager, comprising: a shell assembly; a telescopic rotating motor fixedly arranged in the shell assembly; a telescopic frame assembly is movably arranged on the shell assembly and is drivingly connected to the telescopic rotating motor, the telescopic rotating motor drives the telescopic frame assembly to telescope and rotate relative to the shell assembly; a cup body assembly is transmission-connected to the telescopic frame assembly, the telescopic frame assembly drives the cup body assembly to telescope and rotate relative to the shell assembly; wherein the telescopic frame assembly comprises bracket; a plurality of guide shafts respectively fixedly arranged on the bracket are respectively movably arranged in the shell assembly; a transmission mechanism movably arranged on the bracket and transmission-connected to the telescopic rotating motor; a positive electrode electrical connection sheet and a negative electrode electrical connection sheet, which are respectively fixedly arranged on the bracket and insulated from each other, are respectively rotatably electrically connected to the cup body assembly.

In one embodiment, the bracket adopts insulating material and is provided with an accommodating cavity, the transmission mechanism is arranged in the accommodating cavity, the telescopic rotating shaft of the telescopic rotating motor which passes through the accommodating cavity is transmission-connected to the transmission mechanism.

In one embodiment, the bracket is respectively insulated with a first fixing groove and a second fixing groove, the positive electrode electrical connection sheet and the negative electrode electrical connection sheet are respectively fixedly arranged in the first fixing groove and the second fixing groove.

In one embodiment, the transmission mechanism comprises a bearing, and the outer ring of the bearing is fixedly arranged in the accommodating cavity; a connecting block is fixedly passed through the inner ring of the bearing, one end of which is fixedly connected to the telescopic rotating shaft of the telescopic rotating motor; a rotating block fixedly connected to the other end of the connecting block is fixedly connected to the cup body assembly.

In one embodiment, the bearing adopts a hardware bearing.

In one embodiment, the cup body assembly comprises a connecting piece, which is fixedly connected to the rotating block; a cup body mechanism fixed on the connecting piece, an adapter circuit board and a polarization motor respectively fixed on the connecting piece, the adapter circuit board passes through the connecting piece and is rotatably electrically connected to the positive electrode electrical connection sheet and the negative electrode electrical connection sheet respectively; the polarization motor is fixedly arranged on the connecting piece and is electrically connected to the adapter circuit board.

In one embodiment, the connecting member is provided with two second through holes, the adapter circuit board is provided with two electrical connection pins, which are rotatably electrically connected to the positive electrode electrical connection sheet and the negative electrode electrical connection sheet respectively through the corresponding second through holes.

In one embodiment, the cup body mechanism comprises a supporting frame, which is fixedly connected to the connecting piece; a cup body wrapped on the supporting frame is an elastic cavity.

In one embodiment, the material of the cup body adopts TPE soft rubber.

In one embodiment, the cup body comprises an integrally formed connecting cavity and an elastic cavity; the connecting cavity wraps the supporting frame.

In one embodiment, a plurality of convex columns and/or a plurality of convex blocks are respectively arranged on the inner wall of the elastic cavity.

In one embodiment, the shell assembly comprises a first shell and a second shell that are fixedly connected.

In one embodiment, a plurality of buckles are arranged on the first shell; the second shell is provided with clamping holes at positions corresponding to the plurality of buckles, the clamping holes engage with the corresponding buckles for a latched connection.

In one embodiment, a plurality of positioning columns are arranged on the inner wall of the first shell; the second shell and the positioning columns are provided with positioning holes at the corresponding positions, the positioning holes engage with the corresponding positioning columns for a snap-fit connection.

In one embodiment, the first shell and the second shell are provided with limiting notches at corresponding positions, the two corresponding limiting notches form a limiting hole, a guide seat is movably arranged in the corresponding limiting hole.

In one embodiment, it also comprises a circuit board and a battery assembly respectively fixedly arranged in the shell assembly; a button assembly and an indicator light assembly respectively arranged on the circuit board and passed through the shell assembly; a charging interface that passes through and is fixedly arranged on the shell assembly; the circuit board is electrically connected to the telescopic rotating motor, the telescopic frame assembly, the cup body assembly, the battery assembly, the button assembly, the charging interface, and the indicator light assembly respectively.

In one embodiment, the battery assembly adopts a polymer lithium-ion battery; the charging interface performs a charging operation on the battery assembly.

In one embodiment, the charging interface is a Micro USB interface, a USB Type C interface, a Lightning interface or a DC charging interface.

The adult massager, comprising: the shell assembly; the telescopic rotating motor fixedly arranged in the shell assembly; the telescopic frame assembly is movably arranged on the shell assembly and is drivingly connected to the telescopic rotating motor, the telescopic rotating motor drives the telescopic frame assembly to telescope and rotate relative to the shell assembly; the cup body assembly is transmission-connected to the telescopic frame assembly, the telescopic frame assembly drives the cup body assembly to telescope and rotate relative to the shell assembly.

After adopting the above technical solutions, the adult massager provided by the present disclosure has beneficial effects as follows:

In the embodiment of the present invention, the adult massager uses a telescopic rotating motor to drive the cup body assembly to rotate and retract relative to the shell assembly through the transmission of the connecting block and the rotating block then the vibration function of the cup body assembly is realized by the polarization motor arranged in the cup body assembly, so that the massager can vibrate, rotate and retract at the same time, which improves the user experience and satisfaction to a certain extent. The adult massager of the present invention has the characteristics of simple structure and convenient use.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
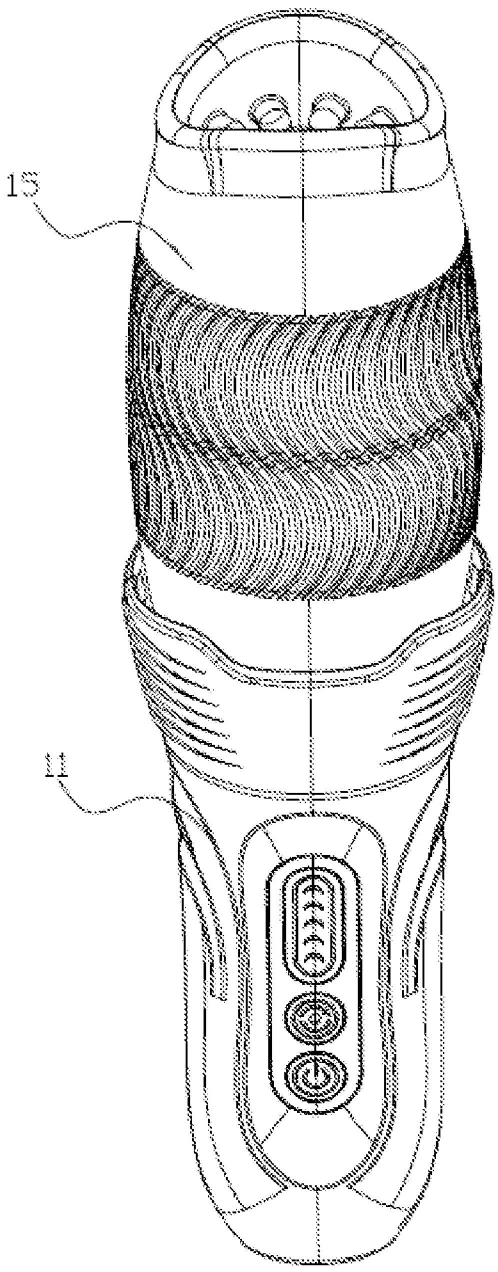
FIG. 1 is a schematic structural diagram of an adult massager provided by the present disclosure.

Reference number in the drawings:

| | | | |
|---|---|---|---|
| shell assembly | 11 | first shell | 111 |
| first through hole | 1111 | buckle | 1112 |
| positioning column | 1113 | second shell | 112 |
| limiting notch | 1121 | clamping hole | 1122 |
| positioning hole | 1123 | panel shell | 113 |
| circuit board | 12 | telescopic rotating motor | 13 |
| telescopic frame assembly | 14 | bracket | 141 |
| accommodating cavity | 1411 | first fixing groove | 1412 |
| second fixing groove | 1413 | guide shaft | 142 |
| negative electrode | 143 | bearing | 1431 |
| connecting block | 1432 | rotating block | 1433 |
| positive electrode electrical connection sheet | 144 | negative electrode electrical connection sheet | 145 |
| cup body assembly | 15 | connecting piece | 151 |
| second through hole | 1511 | cup body mechanism | 152 |
| supporting frame | 1521 | cup body | 1522 |
| connecting cavity | 15221 | elastic cavity | 15222 |
| convex column | 152221 | convex block | 152222 |
| adapter circuit board | 153 | electrical connection pins | 1531 |
| polarization motor | 154 | battery assembly | 16 |
| button assembly | 17 | charging interface | 18 |
| indicator light assembly | 19 | | |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In order to make the purpose, technical solutions, and advantages of the present disclosure clear, the following further describes the present disclosure in detail with reference to accompanying drawings and embodiments.

Referring to FIG. 1 to FIG. 8, the present disclosure provides a shell assembly 11, a circuit board 12, a telescopic rotating motor 13, a telescopic frame assembly 14, a cup body assembly 15, a battery assembly 16, a button assembly 17, a charging interface 18 and an indicator light assembly 19; the shell assembly 11 is a hollow cavity; the circuit board 12, the telescopic rotating motor 13, and the battery assembly 16 are respectively fixedly arranged in the shell assembly 11, the circuit board 12 is electrically connected to the telescopic rotating motor 13, the telescopic frame assembly 14, the cup body assembly 15, the battery assembly 16, the button assembly 17, the charging interface 18 and the indicator light assembly 19 respectively; the battery assembly 16 respectively provides power to the circuit board 12, the telescopic rotating motor 13, the cup body assembly 15 and the indicator light assembly 19; the telescopic frame assembly 14 is movably arranged on the shell assembly 11 and is drivingly connected to the telescopic rotating moto 13, the telescopic rotating motor 13 drives the telescopic frame assembly 14 to telescope and rotate relative to the shell assembly 11; the cup body assembly 15 is transmission-connected to the telescopic frame assembly 14, the telescopic frame assembly 14 drives the cup body assembly 15 to telescope and rotate relative to the shell assembly 11; the button assembly 17 and the indicator light assembly 19 are respectively arranged on the circuit board 12 and passed through the shell assembly 11, the massager is turned on and off and its functions settings through the button assembly 17, and the indicator light assembly 19 indicates the power level of the massager; the charging interface 18 is fixedly provided on the shell assembly 11 and is electrically connected to the circuit board 12, and performs a charging operation on the battery assembly 16.

Referring to FIG. 1 to FIG. 4, in the embodiment, the shell assembly 11 comprises a first shell 111 and a second shell 112, which are fastened to form a hollow cavity to accommodate the circuit board 12, the telescopic rotating motor 13 and the battery assembly 16. Specifically, a plurality of first through holes 1111 are provided through the first shell 111, the button assembly 17 and the indicator light assembly 19 pass through the first shell 111 through the corresponding first through holes 1111 respectively. A panel shell 113 is provided on the first shell 111 and its position corresponds to the position of the button assembly 17 and the indicator light assembly 19, the button assembly 17 can be pressed through the panel shell 113, and the light emitted by the indicator light assembly 19 can be transmitted out of the panel shell 113; a plurality of buckles 1112 are provided on the first shell 111, and the first shell 111 is fixedly connected to the second shell 112 through the plurality of buckles 1112; a plurality of positioning columns 1113 are provided on the inner wall of the first shell 111, and positioning by the plurality of positioning columns 1113 can conveniently and quickly realize the fixed connection between the first shell 111 and the second shell 112.

Figure 4:
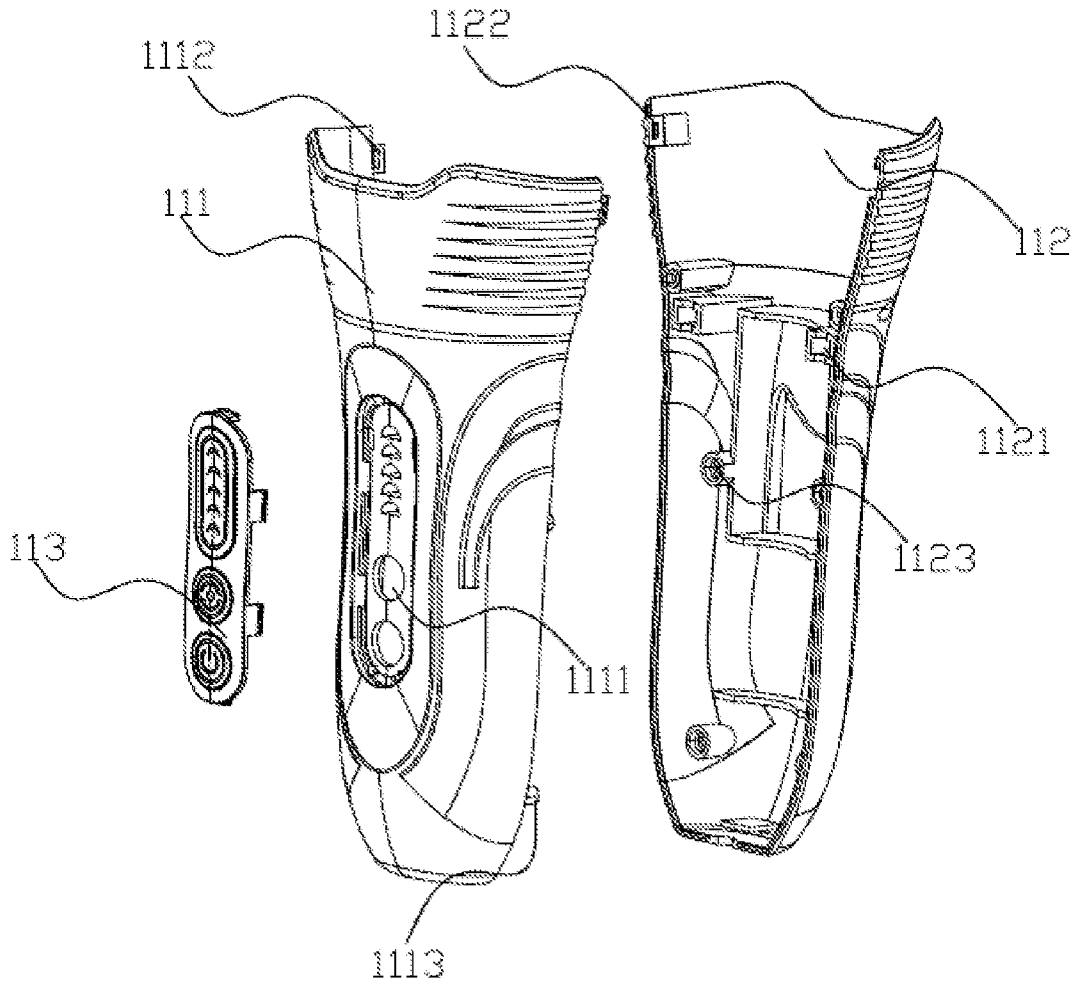
FIG. 4 is a schematic diagram of the exploded structure of the shell assembly shown in FIG. 3.

Referring to FIG. 4, in the embodiment, the first shell 111 and the second shell 112 are provided with limiting notches 1121 at corresponding positions, a limiting hole is formed by the two corresponding limiting notches 1121, so as to facilitate the guiding operation of the telescopic movement of the telescopic frame assembly 14; the second shell 112 is provided with a plurality of clamping holes 1122, and the positions of the plurality of clamping holes 1122 correspond to the positions of the corresponding buckles 1112, and the first shell 111 and the second shell 112 are fixedly connected by the clamping holes 1122 and the buckles 1112; the plurality of positioning holes 1123 are provided on the inner wall of the second shell 112, and the positions of the plurality of positioning holes 1123 correspond to the positions of the corresponding positioning columns 1113. Through the cooperation of the positioning holes 1123 and the positioning columns 1113, the first shell 111 and the second shell 112 can be positioned and docked conveniently and quickly, thereby improving the assembly efficiency of the two.

Figure 2:
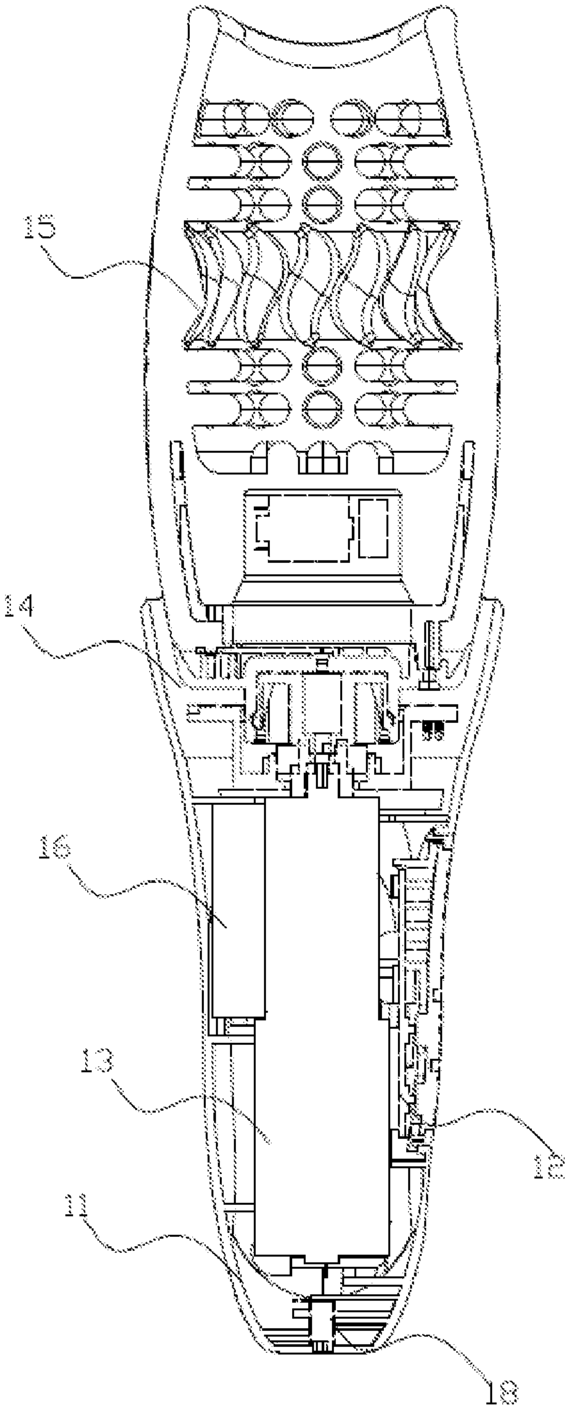
FIG. 2 is a schematic cross-sectional view of the structure of an adult massager of the present disclosure shown in FIG. 1.
Figure 3:
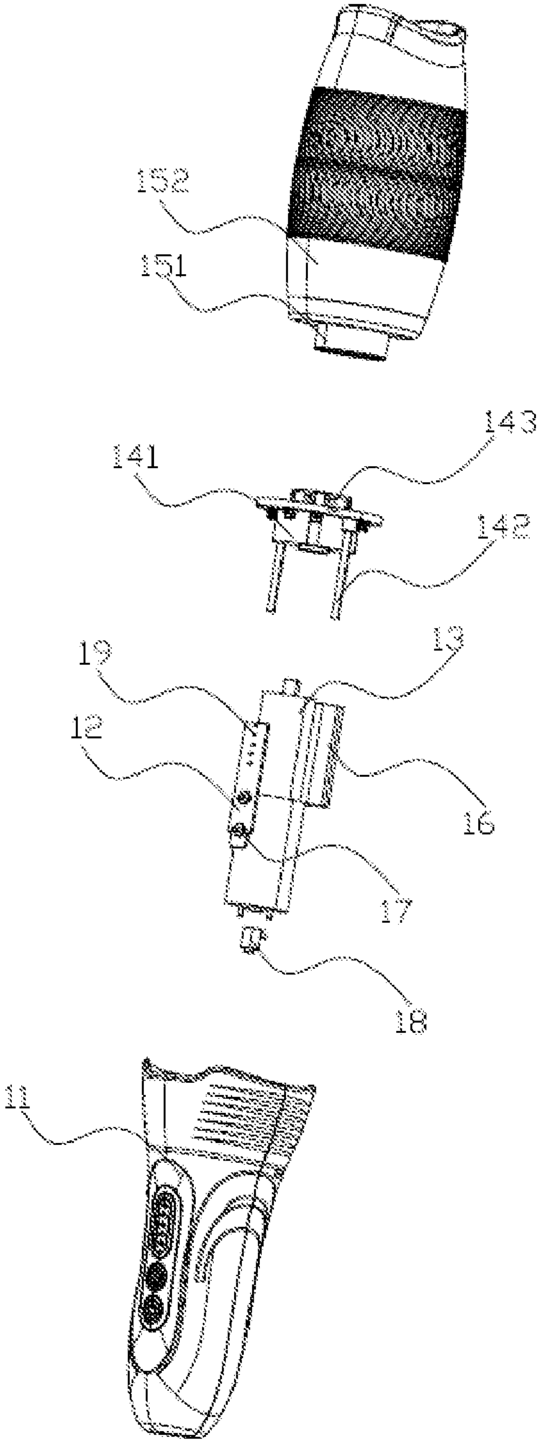
FIG. 3 is a schematic diagram of an exploded structure of an adult massager of the present disclosure shown in FIG. 1, comprising a shell assembly, a telescopic frame assembly and a cup body assembly.
Figure 5:
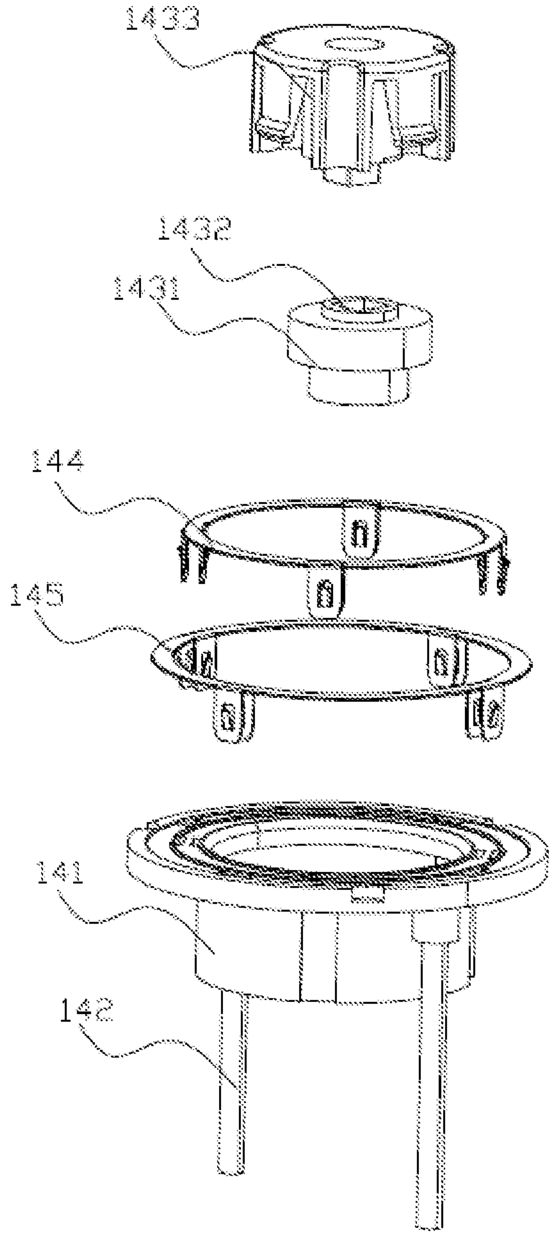
FIG. 5 is an exploded structural schematic diagram of the telescopic frame assembly shown in FIG. 3, comprising a bracket.

Referring to FIG. 2, FIG. 3 and FIG. 5, the telescopic frame assembly 14 comprises a bracket 141, a plurality of guide shafts 142, a transmission mechanism 143, a positive electrode electrical connection sheet 144 and a negative electrode electrical connection sheet 145; the bracket 141 is a supporting body; the plurality of guide shafts 142 are respectively fixedly provided on the bracket 141 and are respectively movably provided in corresponding limiting holes, so as to guide the movement of the guide shafts 142; the transmission mechanism 143 is movably provided on the bracket 141 and is in transmission connection with the telescopic rotating motor 13. The telescopic rotating motor 13 drives the bracket 141 and the cup body assembly 15 to perform synchronous telescopic movement through the transmission mechanism 143, and drives the cup body assembly 15 to rotate at the same time; the positive electrode electrical connection sheet 144 and the negative electrode electrical connection sheet 145 are both hollow ring structures, and are insulated and fixedly provided on the bracket 141 and are electrically connected to the circuit board 12 respectively, the positive electrode electrical connection sheet 144 and the negative electrode electrical connection sheet 145 cooperate to provide electrical energy to the cup body assembly 15. In this embodiment, the two guide shafts 142 are symmetrically fixedly provided on the bracket 141 and are movably provided in corresponding limiting holes respectively; in other embodiments, the number of guide shafts 142 can be three, four, or any other plurality, and the number is set according to actual needs.

Figure 6:
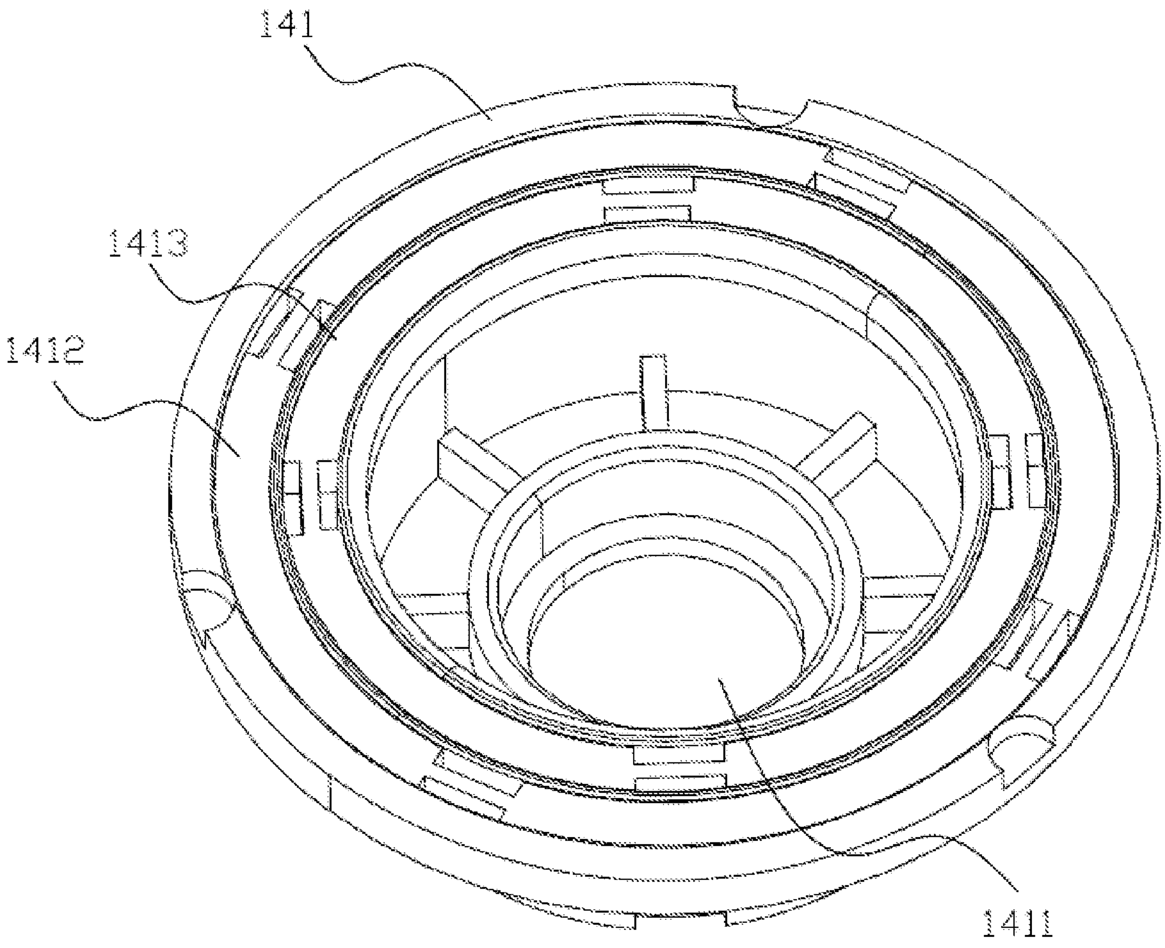
FIG. 6 is a schematic structural diagram of the bracket shown in FIG. 5.

Referring to FIG. 5 and FIG. 6, the bracket 141 adopts insulating material and is provided with an accommodating cavity 1411, the transmission mechanism 143 is arranged in the accommodating cavity 1411, the telescopic rotating shaft of the telescopic rotating motor 13 which passes through the accommodating cavity 1411 is transmission-connected to the transmission mechanism 143, thereby synchronously driving the transmission mechanism 143 to rotate and telescope; the bracket 141 is respectively insulated with a first fixing groove 1412 and a second fixing groove 1413, the positive electrode electrical connection sheet 144 and the negative electrode electrical connection sheet 145 are respectively fixedly arranged in the first fixing groove 1412 and the second fixing groove 1413, so as to effectively achieve insulation between the positive electrode electrical connection sheet 144 and the negative electrode electrical connection sheet 145.

Referring to FIG. 5, in the embodiment, the transmission mechanism 143 comprises a bearing 1431, a connecting block 1432 and a rotating block 1433; the outer ring of the bearing 1431 is fixedly arranged in the accommodating cavity 1411; the connecting block 1432 is fixedly passed through the inner ring of the bearing 1431 and the two are fixedly connected, one end of which is fixedly connected to the telescopic rotating shaft of the telescopic rotating motor 13; the other end is fixedly connected to the rotating block 1433, the telescopic rotating motor 13 drives the rotating block 1433 to rotate relative to the bracket 141 through the connecting block 1432, and simultaneously drives the bracket 141 and the rotating block 1433 to telescopic movement; the cup body assembly 15 is fixedly connected to the rotating block 1433, and moves along with the movement of the rotating block 1433. Specifically, the bearing 1431 adopts a hardware bearing, which can effectively reduce noise and prevent the product from shaking.

Referring to FIG. 1, FIG. 2, FIG. 3 and FIG. 7, in the embodiment, the cup body assembly 15 comprises a connecting piece 151, a cup body mechanism 152, a adapter circuit board 153 and a polarization motor 154; the connecting piece 151 is fixedly connected to the rotating block 1433; the cup body mechanism 152 is fixedly provided on the connecting piece 151 and moves along with the movement of the connecting piece 151; the adapter circuit 153 passes through the connecting piece 151 and is rotatably electrically connected to the positive electrode electrical connection sheet 144 and the negative electrode electrical connection sheet 145 respectively; the polarization motor 154 is electrically connected to the adapter circuit board 153, so as to provide electric energy to the polarization motor 154, so that the polarization motor 154 works and thus provides vibration to the cup body mechanism 152. Specifically, the connecting member 151 is provided with two second through holes 1511, the adapter circuit board 153 is provided with two electrical connection pins 1531, which are rotatably electrically connected to the positive electrode electrical connection sheet 144 and the negative electrode electrical connection sheet 145 respectively through the corresponding second through holes 1511.

Figure 7:
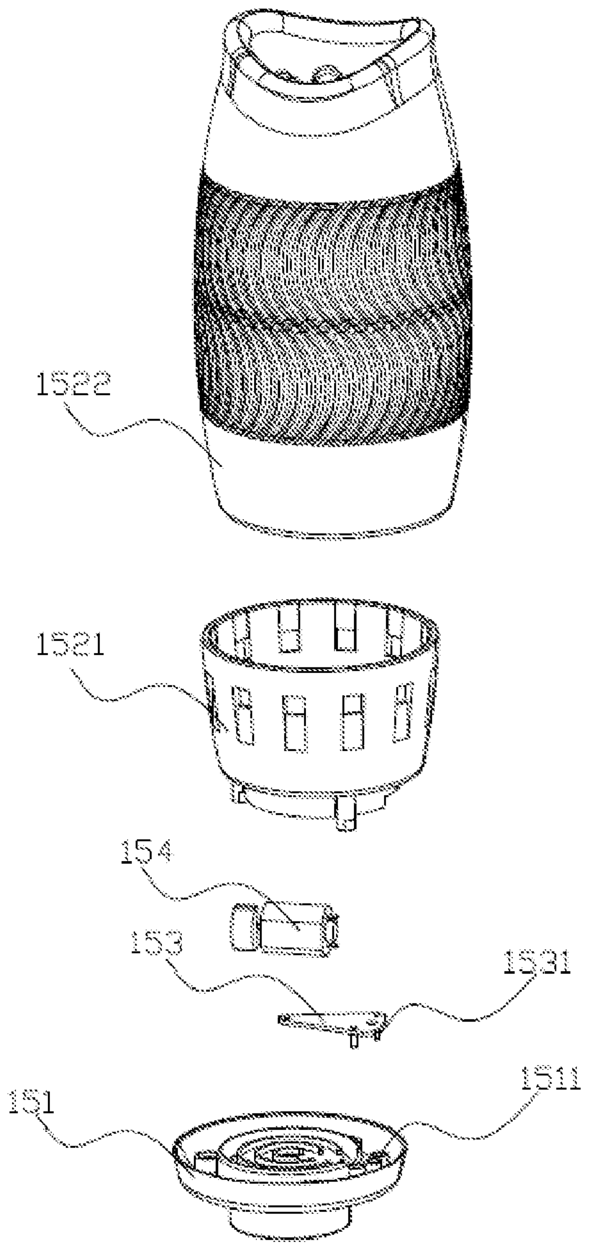
FIG. 7 is a schematic diagram of the exploded structure of the cup body assembly shown in FIG. 3, comprising a cup body.
Figure 8:
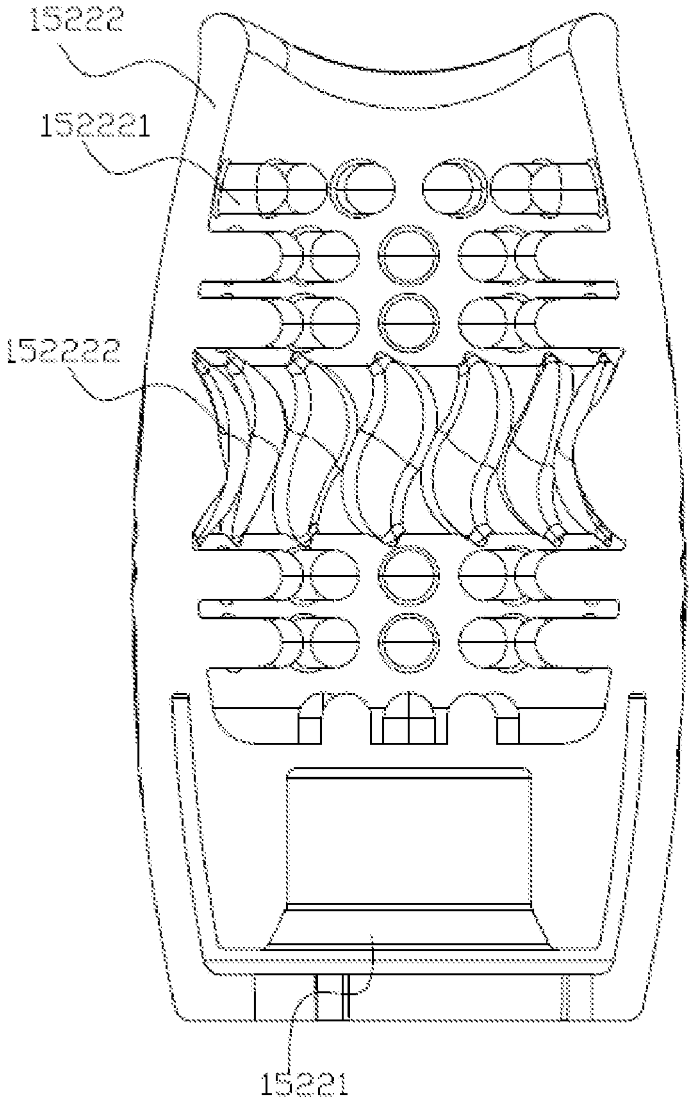
FIG. 8 is a schematic diagram of the cross-sectional structure of the cup body shown in FIG. 7.

Referring to FIG. 7 and FIG. 8, in the embodiment, the cup body mechanism 152 comprises a supporting frame

1521 and a cup body 1522, the supporting frame 1521 is fixedly connected to the connecting piece 151; the cup body 1522 wrapped on the supporting frame 1521 is an elastic cavity. Specifically, the material of the cup body 1522 adopts TPE soft rubber, the cup body comprises an integrally formed connecting cavity 15221 and elastic cavity 15222; the connecting cavity 15221 wraps the supporting frame 1521; a plurality of convex columns 152221 and a plurality of convex blocks 152222 are respectively arranged on the inner wall of the elastic cavity 15222, thereby improving the user experience. In some embodiments, only the plurality of convex columns 152221 are provided on the inner wall of the elastic cavity 15222; in other embodiments, only the plurality of convex blocks 152222 are provided on the inner wall of the elastic cavity 15222.

Referring to FIG. 2 and FIG. 3, a battery assembly 16 can be a dry cell battery or a rechargeable battery. In this embodiment, the battery assembly 16 adopts a polymer lithium-ion battery. Specifically, a button assembly 17 comprises a switch button and a plurality of function buttons. The switch button controls the switch of the massager, and the plurality of function buttons respectively control different functions. A charging interface 18 can be a Micro USB interface, a USB Type C interface, a Lightning interface or a DC charging interface. In this embodiment, the charging interface 18 is the DC charging interface; an indicator light assembly 19 comprises a plurality of LED lamps, which are respectively fixed on the circuit board 12 and passed through the shell assembly 11.

It should be noted that the specific working process of the adult massager of the present invention is as follows: the telescopic rotating motor 13 drives the cup body assembly 15 to rotate through the transmission action of the connecting block 1432 and the rotating block 1433 in sequence, thereby realizing the rotation function of the cup body assembly 15; at the same time, the telescopic rotating motor 13 drives the bracket 141 to perform telescopic operation under the guidance of the guide shaft 142 through the connecting block 1432 and the bearing 1431 in sequence. Since the cup body assembly 15 is fixedly connected to the rotating block 1433, and the rotating block 143 is fixedly connected to the connecting block 1432, the cup body assembly 15 is synchronously telescoped with the bracket 141, thereby realizing the telescopic function of the cup body assembly 15; and the vibration function of the cup body assembly 15 is realized by the polarization motor 154 provided in the cup body assembly 15.

The technical features of the above-described embodiments may be arbitrarily combined. To make the description concise, not all possible combinations of the technical features in the embodiments are described. However, as long as there is no contradiction in the combination of these technical features, they should be considered to be within the scope of this specification.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. An adult massager, comprising:

a shell assembly;

a telescopic rotating motor fixedly arranged in the shell assembly;

a telescopic frame assembly movably arranged on the shell assembly and drivingly connected to the telescopic rotating motor, the telescopic rotating motor configured to drive the telescopic frame assembly to telescope and rotate relative to the shell assembly;

a cup body assembly transmission-connected to the telescopic frame assembly, the telescopic frame assembly configured to drive the cup body assembly to telescope and rotate relative to the shell assembly;

wherein the telescopic frame assembly comprises a bracket; a plurality of guide shafts respectively fixedly arranged on the bracket are respectively movably arranged in the shell assembly; a transmission mechanism movably arranged on the bracket and transmission-connected to the telescopic rotating motor; a positive electrode electrical connection sheet and a negative electrode electrical connection sheet, which are respectively fixedly arranged on the bracket and insulated from each other, are respectively rotatably and electrically connected to the cup body assembly.

2. The adult massager of claim 1, wherein the bracket comprises insulating material and is provided with an accommodating cavity, the transmission mechanism is arranged in the accommodating cavity, a telescopic rotating shaft of the telescopic rotating motor, passed through the accommodating cavity, is transmission-connected to the transmission mechanism.

3. The adult massager of claim 2, wherein the bracket is respectively insulated with a first fixing groove and a second fixing groove, the positive electrode electrical connection sheet and the negative electrode electrical connection sheet are respectively fixedly arranged in the first fixing groove and the second fixing groove.

4. The adult massager of claim 2, wherein the transmission mechanism comprises a bearing, and an outer ring of the bearing is fixedly arranged in the accommodating cavity; a connecting block is fixedly passed through an inner ring of the bearing, one end of the connecting block is fixedly connected to the telescopic rotating shaft of the telescopic rotating motor; a rotating block, fixedly connected to the other end of the connecting block, fixedly connected to the cup body assembly.

5. The adult massager of claim 4, wherein the bearing comprises a hardware bearing.

6. The adult massager of claim 4, wherein the cup body assembly comprises a connecting piece fixedly connected to the rotating block; a cup body mechanism fixed on the connecting piece, an adapter circuit board and a polarization motor respectively fixed on the connecting piece; the adapter circuit board passes through the connecting piece and is rotatably and electrically connected to the positive electrode electrical connection sheet and the negative electrode electrical connection sheet respectively; the polarization motor is fixedly arranged on the connecting piece and is electrically connected to the adapter circuit board.

7. The adult massager of claim 6, wherein the connecting piece is provided with two through holes, the adapter circuit board is provided with two electrical connection pins, rotatably and electrically connected to the positive electrode electrical connection sheet and the negative electrode electrical connection sheet respectively through the corresponding through holes.

8. The adult massager of claim 6, wherein the cup body mechanism comprises a supporting frame fixedly connected to the connecting piece; a cup body wrapped on the supporting frame is an elastic cavity.

9. The adult massager of claim 8, wherein the material of the cup body comprises TPE soft rubber.

10. The adult massager of claim 9, wherein the cup body comprises an integrally formed connecting cavity and elastic cavity; the connecting cavity configured to wrap the supporting frame.

11. The adult massager of claim 10, wherein a plurality of convex columns and/or a plurality of convex blocks are respectively arranged on an inner wall of the elastic cavity.

12. The adult massager of claim 1, wherein the shell assembly comprises a first shell and a second shell that are fixedly connected.

13. The adult massager of claim 12, wherein a plurality of buckles are arranged on the first shell; the second shell is provided with clamping holes at positions corresponding to the plurality of buckles, the clamping holes configured to engage with the corresponding buckles for a latched connection.

14. The adult massager of claim 12, wherein a plurality of positioning columns are arranged on an inner wall of the first shell; the second shell is provided with positioning holes at the corresponding positions, the positioning holes configured to be engaged with the corresponding positioning columns for a snap-fit connection.

15. The adult massager of claim 12, wherein the first shell and the second shell are provided with limiting notches at corresponding positions, wherein two corresponding limiting notches form a limiting hole, a guide seat is movably arranged in the corresponding limiting hole.

16. The adult massager of claim 1, further comprising a circuit board and a battery assembly respectively fixedly arranged in the shell assembly; a button assembly and an indicator light assembly respectively arranged on the circuit board and passed through the shell assembly; a charging interface configured to be passed through and fixedly arranged on the shell assembly; the circuit board configured to be electrically connected to the telescopic rotating motor, the telescopic frame assembly, the cup body assembly, the battery assembly, the button assembly, the charging interface and the indicator light assembly respectively.

17. The adult massager of claim 16, wherein the battery assembly comprises a polymer lithium-ion battery; the charging interface performs a charging operation on the battery assembly.

18. The adult massager of claim 17, wherein the charging interface is a Micro USB interface, a USB Type C interface, a Lightning interface or a DC charging interface.

* * * * *